United States Patent [19]

Hathaway et al.

[11] Patent Number: 4,901,287
[45] Date of Patent: Feb. 13, 1990

[54] UNDERWATER SONAR ARRAY

[75] Inventors: Daniel G. Hathaway, Sherman Oaks; Robert M. Bridges, Northridge, both of Calif.

[73] Assignee: Allied-Signal Inc., Morris Township, Morris County, N.J.

[21] Appl. No.: 174,046

[22] Filed: Mar. 28, 1988

[51] Int. Cl.4 .............................................. H04B 1/59
[52] U.S. Cl. ........................................ 367/3; 367/20; 441/1; 114/326
[58] Field of Search ............ 367/3, 4, 141, 154, 367/17, 20, 57, 117; 441/1, 21, 28, 23; 114/326, 330; 174/68 R, 99 R, 101.5, 70 S, 88 R; 439/190, 271, 604, 452

[56] References Cited

U.S. PATENT DOCUMENTS

| | | | |
|---|---|---|---|
| 3,371,739 | 3/1968 | Pearson | 367/18 |
| 3,812,455 | 5/1974 | Pearson | 367/154 |
| 4,272,835 | 6/1981 | Flood et al. | 367/4 |
| 4,351,036 | 9/1982 | Mollere | 367/154 X |
| 4,450,543 | 5/1984 | Neeley | 367/154 X |
| 4,491,939 | 1/1985 | Carpenter | 367/154 X |
| 4,503,526 | 3/1985 | Beauducel et al. | 367/13 |
| 4,530,075 | 7/1985 | Pearson | 367/154 X |
| 4,716,554 | 12/1987 | Depew et al. | 367/154 X |

Primary Examiner—Thomas H. Tarcza
Assistant Examiner—Tod R. Swann
Attorney, Agent, or Firm—Robert C. Smith; James W. McFarland; Robert A. Walsh

[57] ABSTRACT

A sonar array connected to a data unit includes a substantial number of hydrophone units distributed along a small diameter cable having a substantial number of connecting wires, a center strength member and a tough polyurethane jacket. The hydrophone units each include a strong metal bracket bifurcated at each end and fastened to the strength member. A generally cylindrical hydrophone member is fastened to the bracket as is a circuit board including a preamplifier and the entire unit is sealed with paraxylene resin and then molded into a smooth generally cylindrical unit which is tapered at the ends and sealed to adjacent parts of the cable jacket. To minimize the cross-sectional area and the effects of cross currents, the cable is composed of a plurality of interconnected sections, each of which is of smaller cross-section and carries fewer conductors than the section next closer to the data unit. To assure that the array extends substantially vertically from the data unit, either a weight or a float is fastened to the cable at the end remote from the data unit.

12 Claims, 3 Drawing Sheets

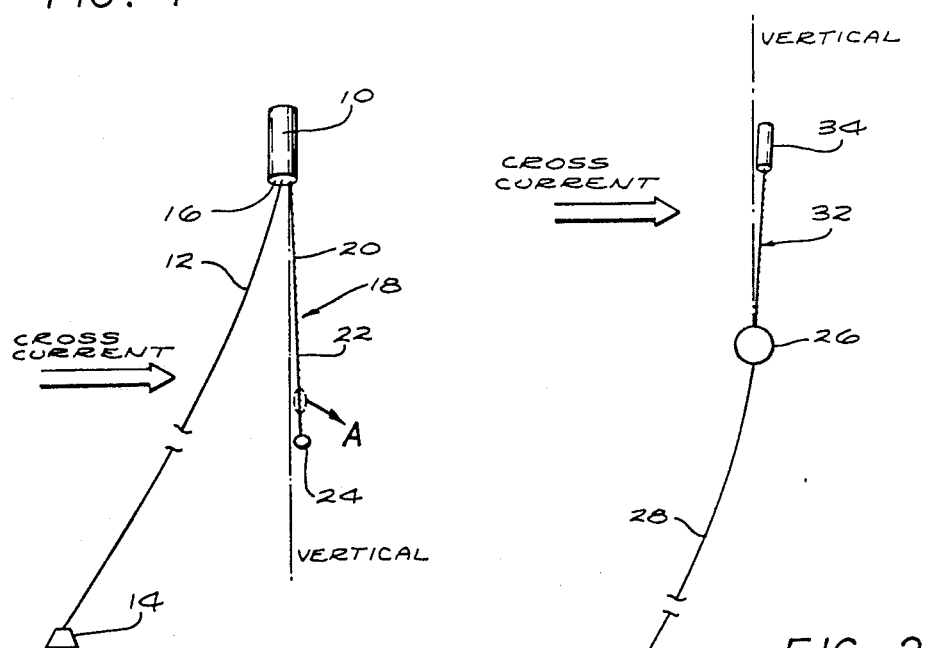
FIG. 1
FIG. 2
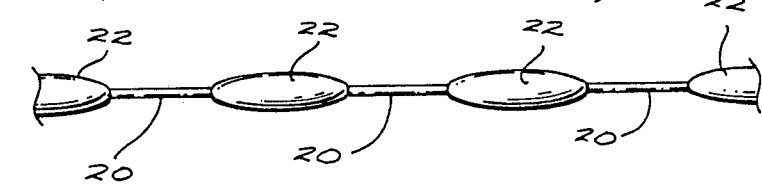
FIG. 1A
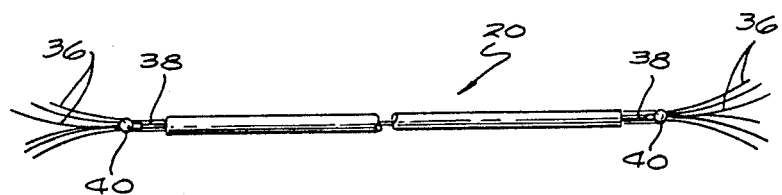
FIG. 3

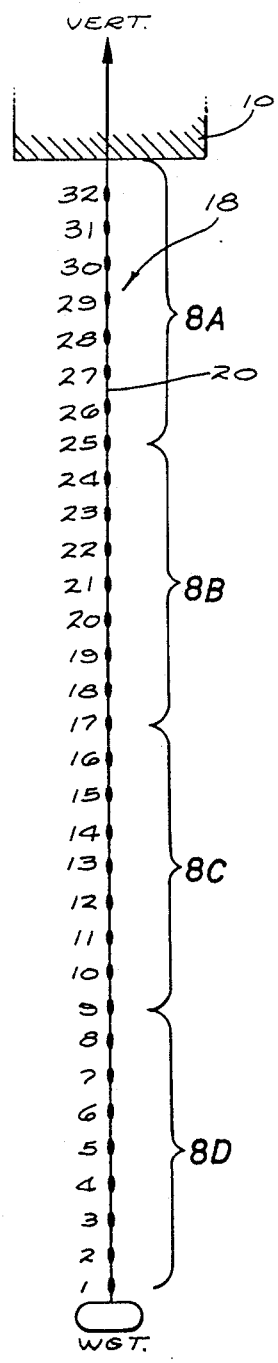
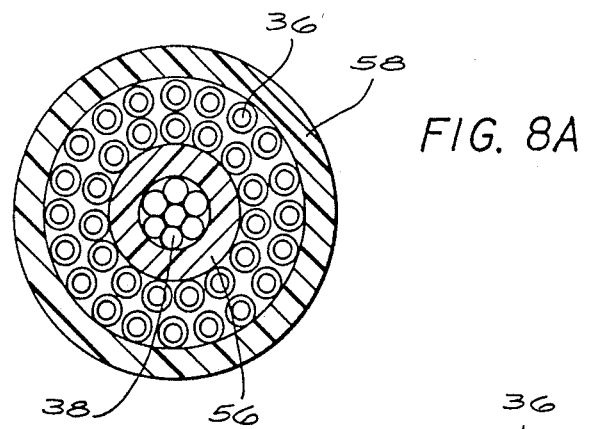
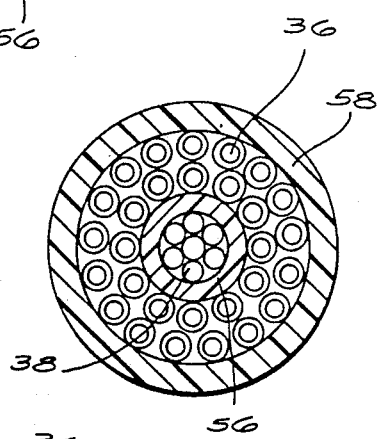
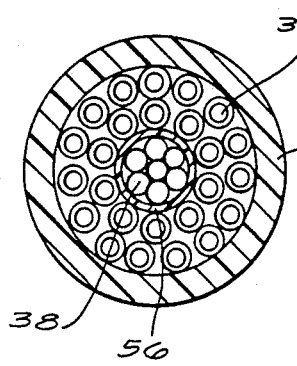
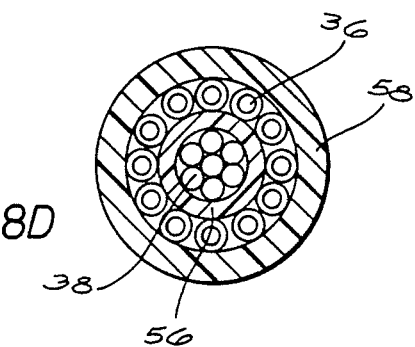
FIG. 8
FIG. 8A
FIG. 8B
FIG. 8C
FIG. 8D

UNDERWATER SONAR ARRAY

This invention relates to underwater sonar arrays and more particularly to an elongated array construction which is caused to remain essentially vertical despite being exposed to significant cross currents.

There are a number of applications for sonar arrays placed in the ocean or other body of water wherein it is desired to maintain the array in a generally vertical attitude. Such arrays are normally supported on a rigid member, or are comparatively short. With arrays attached to a cable, the problem of maintaining an essentially vertical array becomes greater as the length of the array becomes greater and as effect of cross currents become larger and tends to exert force against the effective area of the array. This force tends to cause the array to move some distance from the vertical which is an undesired effect since the hydrophones usually employed in such applications cooperate to form a receiving pattern which is essentially perpendicular to the array. If the array is significantly tilted, the pattern is tilted and will provide misleading information as to the location of any sound source detected.

The Applicants have devised a sonar array of substantial length in which a number of hydrophones are distributed along a cable and which has a minimum amount of deflection from the vertical if placed at a substantial depth in the ocean where the cross currents do not exceed 1-2 knots. The array is attached to a tethered data collection and instrumentation unit and may be suspended therefrom and held vertical by means of a weight or may be held above the data collection and instrumentation unit (hereafter "data unit") by means of a float. The cable itself has been designed to present a minimum cross sectional area to the currents tending to push the array horizontally. In addition to making the hydrophone units as small and smooth as possible, the cable itself has been designed such that, as the need for conducting wires is reduced with distance from the data unit (since several hydrophones are connected close to the data unit and there is no need to extend their conductors further), the effective diameter of the cable may be reduced. Although this reduction could be done at each hydrophone, the practical choice is to divide the cable into a reasonable number of sections such as four or six and provide a smaller diameter section for each one-fourth or one-sixth of the entire cable length. This reduces the number of interconnections to a reasonable number and still has the very beneficial effect of reducing the effective area of the cable exposed to cross currents. Since the greatest number of conducting wires and the largest diameter must necessarly be in the cable section closest to the data unit, the next greatest number of wires and next greatest diameter must be in the cable next outboard from the first, etc., with the smallest diameter and fewest wires in the section most remote from the data unit, it will be clear that the effective lever arm of the current force acting on the array is shortened and placed closer to the data unit. Thus the force on the array from cross currents is reduced because the hydrophone units are quite small and smooth, and the cable, being of progressively smaller diameter with greater distance from the data unit not only presents a smaller cross section to the current, but the effective lever arm acting on the cable is significantly shortened.

Referring now to the drawings:

FIG. 1 is a schematic drawing of the data unit, the sonar array, the tether and the anchor placed in the ocean;

FIG. 1A is a large scale drawing of portion A of FIG. 1;

FIG. 2 is a schematic drawing of a data unit, tether, anchor and another embodiment of the sonar array.

FIG. 3 is a drawing of a portion of the cable with the jacket partly removed, showing the end fittings used for the strength members;

FIG. 8 is a schematic drawing of the array shown in association with cross sectional views of the cable used in the various sections designated Figures 8A, 8B, 8C and 8D.

Figure 4:
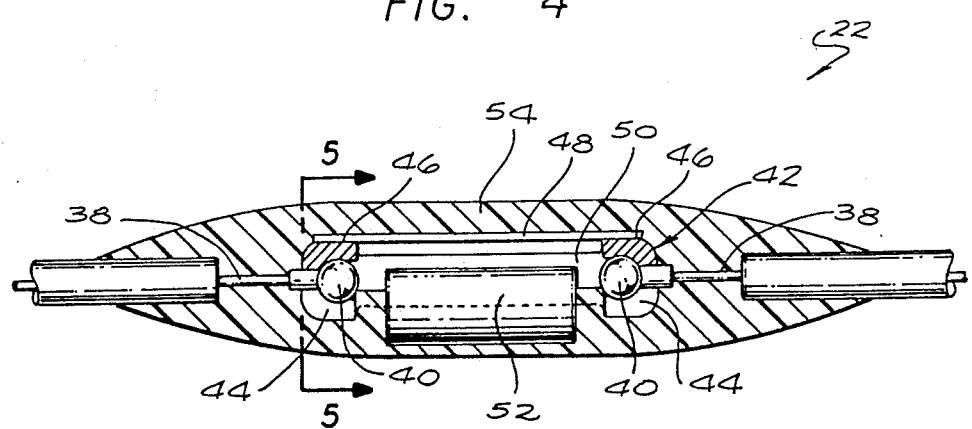
FIG. 4 is a cross sectional view of a hydrophone unit used in the array of the present invention.

Referring now to FIG. 1, a data and instrumentation unit 10 is anchored to the ocean bottom by means of a tethering rope or cable 12, and an anchor 14. The tether is attached essentially at the center of an end panel 16 of the data unit 10. Also attached to data unit 10 and extending vertically downwardly from near an edge of the same end panel is an acoustic array 18 including a cable 20 and a substantial number of hydrophone units 22 fastened to the cable. A weight 24, preferably in the form of an oblate spheroid is attached at the end of the array and tends to keep the array in a near vertical attitude.

FIG. 1A is an enlarged view of a portion of array 18 showing the general arrangement of the hydrophone units 22 along the cable 20. It will be observed that the hydrophone units 22 are smoothly molded to the cable 20 to produce as little resistance or drag as possible, consistent with their required diameter.

FIG. 2 shows a second embodiment of our array attached to a data unit 26 which is tethered to the ocean bottom by means of a rope or cable 28 held in place with an anchor 30. In this embodiment, instead of being suspended from the data unit as in FIG. 1, the array 32 is attached to the data unit 26 at the top and is suspended from a float 34. The float 34 is preferably designed to present as small a surface as possible in the direction of the cross currents in order to keep the array 32 in as nearly vertical an attitude as possible.

When attaching the hydrophone units 22 to the cable 20, a portion of the jacket is cut away to expose the conducting wires 36 and the strength member 38, which is a wire rope which may be three sixty-fourths inch (3/64") in diameter, or a comparable size depending somewhat upon the length the array used and the ballast weight employed. The strength member is cut and a portion removed which is slightly shorter than the length of the bracket employed in the hydrophone unit 22. At each end of the strength member thus formed, a ball fitting 40 is swaged in place, attaching it very securely to the wire rope.

FIG. 4 is a cross-sectional view of a hydrophone unit 22 showing two sections of the center strength member 38 with the attached ball fittings 40 engaged with opposite ends of a bracket member 42 which forms part of the hydrophone unit 22. In addition to the bifurcated ball receiving hooks 44, the bracket 42 includes flattened end parts 46 which support a circuit board 48 containing a preamplifier and a pair of tension members 50 extending between the hook parts which form a receptacle for a cylindrical hydrophone 52. This entire assembly is covered with a first layer of paraxylene resin and then molded into a smooth tapered cylindrical form covering part of the cable 20 as shown with a potting 54 of polyurethane material. Also included in the molded assembly are the conducting wires 36, which are not shown to avoid confusing the drawing.

Figure 5:
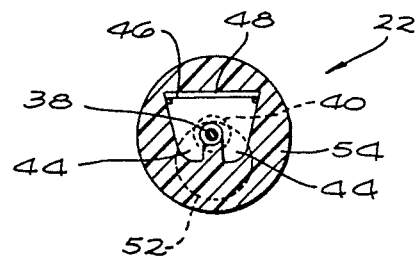
FIG. 5 is a cross-sectional view taken through line 5—5 of FIG. 4.

FIG. 5 is a cross-sectional view taken along line 5—5 of FIG. 4 and shows the bracket member 42 in end view with the flattened end part 46 supporting circuit board 48 and hook 44 which captures the ball fitting 40. The hydrophone 50 is shown in dotted outline with the entire assembly encased in the molded polyurethane material.

Figure 6:
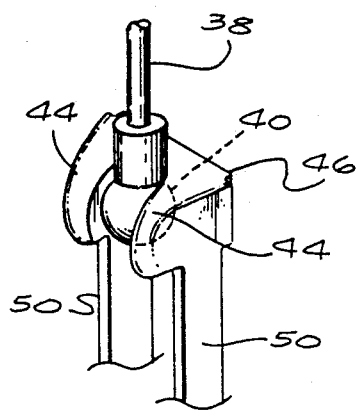
FIG. 6 is a perspective view of part of a portion of the bracket member used in the hydrophone unit of FIGS. 4 and 5.
Figure 7:
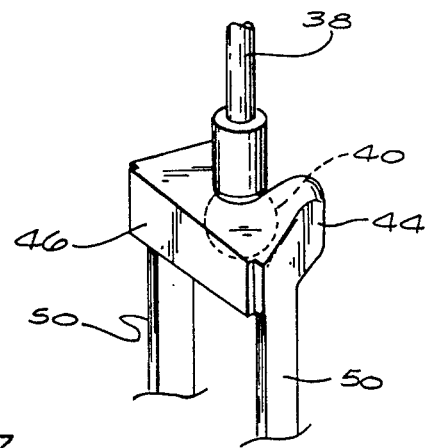
FIG. 7 is a perspective view of part of the bracket member of FIG. 6, seen from the opposite side.

FIGS. 6 and 7 are perspective views of opposite sides of one end of the bracket 42 shown in association with the ball fitting 40 attached to cable 38. In FIG. 6 the open end of the hook portion 44 is facing the reader and the ball fitting member 40 is shown seated against hook portion 40. In FIG. 7, the same structure is shown turned the opposite way with the flattened circuit board support part 46 facing the reader. It will be understood that the bracket 42 is symmetrical and that the lower half would appear as a mirror image of those shown in FIGS. 6 and 7.

In FIG. 8 is shown a diagrammatic representation of the array 18 in association with a number of cross-sections of cable 20 showing the manner in which the cable is, or may be, reduced in cross-section with greater distances from the data unit 10. The array 18 contemplates a string of 32 hydrophones divided into four groups, each of which incorporates a different number of conductors. Beginning with the cable section nearest the data unit 10, the cable section shown in FIG. 8A includes the center strength member 38, a layer of insulation 56 covering member 38, thirty-five insulated conducting wires 36 and an outer jacket 58. The next cable section outboard of the first is shown in FIG. 8B. In addition to the strength member 38, insulation layer 56 and jacket 58, this section has twenty-nine conducting wires and is significantly smaller in diameter. The third cable section shown in FIG. 8C is still smaller in diameter and carries 25 conductors. The fourth cable section shown in FIG. 8D is the smallest and, as shown, contains twelve conductors. The particular proportions of diameters and numbers of wires shown is purely exemplary, as are the numbers of sections shown. Choices may be made on the basis of available sizes and configurations of cable which are otherwise suitable since cables with optimum diameters and numbers of conductors may not be available for all of the desired combinations of hydrophone members and numbers of sections.

From the above it will be clear that Applicants have devised a sonar array which may be of substantial length and which, in deep water where current velocities are limited, will maintain an attitude very close to vertical. This array is comparatively straightforward in design and may be made in many forms. While Applicants have described an array which has thirty-two hydrophone units, is approximately eight-four feet long and is divided into four approximately equal length cable sections, others may choose to use fewer or greater numbers of hydrophone units and different numbers of cable sections. Other modifications will occur to those skilled in the art.

We claim:

1. In an underwater sonar system including a data collection and instrumentation unit A hydrophone array extending vertically from said data and instrumentation unit including an elongated cable containing a center strength member, a plurality of insulated conducting wires, and an external jacket of durable plastic material;

a substantial number of hydrophone units connected to said cable, said hydrophone units each including a bracket member having a pair of longitudinally extending flat parts and a socket part at each end of said flat parts including longitudinally aligned slots operatively connected to said strength member, a hydrophone and a circuit board attached to said bracket member, some of said conducting wires being connected to said circuit board and said hydrophone being connected to said circuit board, said hydrophone units having a coating of paraxylene resin and an external potting coat of polyurethane which is smoothly tapered at each end of said hydrophone units from said brackets to said cable;

said cable including a plurality of sections of progressively smaller diameter attached together with the largest diameter section containing the most conducting wires attached to said data and instrumentation unit, the next smaller diameter cable section having fewer conductive wires being attached to the largest section, and with additional sections progressively becoming smaller in diameter and having fewer conducting wires with the last section having the smallest diameter and the fewest conducting wires.

2. A sonar system as claimed in claim 1 wherein means is attached to the end of said cable remote from said data and instrumentation unit exerting a force tending to hold said cable in a vertical attitude.

3. A sonar system as claimed in claim 2 wherein said means comprises a weight in the form of an oblate spheroid.

4. A sonar system as claimed in claim 2 wherein said means is a float.

5. A sonar system as claimed in claim 2 wherein a tethering line and anchor are fastened to said data and instrumentation unit, said tethering line being anchored to the ocean bottom, and said cable is attached to said data and instrumentation unit at a significant distance from the point of attachment of said tethering line.

6. A sonar array as claimed in claim 5 wherein said circuit board includes a preamplifier.

7. A sonar system as claimed in claim 1 wherein said center strength member has a portion removed at the location of each of said brackets, a fitting with a ball at the end is fastened to the resulting cable ends and said fittings are wedged in said slots in said brackets with said balls behind said slots.

8. A sonar array for attachment to an underwater data collection and instrumentation unit including a cable having a center strength member, a plurality of insulated conducting wires and an external jacket, a plurality of hydrophone units attached to said cable at desired intervals, and means at the end of said cable to tend to cause said cable to be deployed in a substantially vertical attitude;

said hydrophone units each including a bracket member having a pair of longitudinally extending flat parts and a socket part at each end of said flat parts attached to said strength member, a hydrophone attached to said bracket member, electronic circuit means attached to said bracket member and connected to said hydrophone, with some of said conducting wirs being connected to said electronic circuit means;

said cable being formed of a plurality of sections of graduated diameters and numbers of conducting wires, with the section of greatest diameter and numbers of conducting wires being connected closest to said data collection and instrumentation unit and the section of smallest diameter and least number of conducting wires being connected at the greatest distance from said data collection and instrumentation unit.

9. A sonar array as claimed in claim 8 wherein said means at the end of said cable is a weight in the form of an oblate spheroid having its smallest projected area aligned generally perpendicular to said array.

10. A sonar array as claimed in claim 8 wherein said array includes at least approximately thirty-two hydrophones and said cable is formed of at least four sections of graduated diameters.

11. A sonar array as claimed in claim 8 wherein said hydrophone units are coated with paraxylene resin and enclosed in a molded cover of polyurethane.

12. A sonar array as claimed in claim 11 wherein said data collection and instrumentation unit is tethered to the ocean bottom by means of an anchor and a line and the point of attachment of said array to said data and instrumentation unit is significantly spaced from the point of attachment of said line.

* * * * *